United States Patent [19]

Ueno

[11] Patent Number: 4,940,254
[45] Date of Patent: Jul. 10, 1990

[54] SEAT BELT HOLDER POSITION ADJUSTER

[75] Inventor: Shuichi Ueno, Ebina, Japan

[73] Assignee: Nissan Motor Co., Ltd., Yokohama, Japan

[21] Appl. No.: 185,408

[22] Filed: Apr. 25, 1988

[30] Foreign Application Priority Data

May 28, 1987 [JP] Japan .................................. 62-129867
May 29, 1987 [JP] Japan .................................. 62-133959

[51] Int. Cl.$^5$ ............................................. B60R 22/20
[52] U.S. Cl. ..................................... 280/808; 297/483
[58] Field of Search ....................... 280/808, 801, 802; 297/468, 483

[56] References Cited

U.S. PATENT DOCUMENTS

| 4,262,932 | 4/1981 | Motonami et al. | 280/802 |
| 4,536,011 | 8/1985 | Ono | 280/808 |
| 4,640,550 | 2/1987 | Håkansson | 280/808 |
| 4,786,081 | 11/1988 | Schmidt | 280/808 |

FOREIGN PATENT DOCUMENTS

| 0125860 | 11/1984 | European Pat. Off. |
| 0173477 | 3/1986 | European Pat. Off. |
| 2110071 | 6/1983 | United Kingdom . |
| 2124889 | 2/1984 | United Kingdom . |
| 2132071 | 7/1984 | United Kingdom . |
| 2136270 | 9/1984 | United Kingdom . |
| 2138670 | 10/1984 | United Kingdom . |
| 2150011 | 6/1985 | United Kingdom . |
| 2162045 | 1/1986 | United Kingdom . |
| 2176091 | 12/1986 | United Kingdom . |

Primary Examiner—Charles A. Marmor
Assistant Examiner—Karin Tyson
Attorney, Agent, or Firm—Foley & Lardner, Schwartz, Jeffery, Schwaab, Mack, Blumenthal & Evans

[57] ABSTRACT

A seat belt holder position adjuster is disclosed which adjusts the height of a belt holder which supports an uppermost portion of a shoulder belt part of the seat belt. The adjuster comprises an elongate base unit formed with a plurality of latch holes, an anchor unit disposed on the base member in a manner to slide therealong, a belt holding member connected to the anchor unit to move therewith, and a latch pawl unit mounted on the anchor unit. The latch pawl unit includes two shank portions which are latchingly engageable with selected pair of the latch holes of the base member and at least one spring for biasing the shank portions in a direction to establish a latching engagement between the shank portions and the selected pair of the latch holes.

61 Claims, 8 Drawing Sheets

SEAT BELT HOLDER POSITION ADJUSTER

BACKGROUND OF THE INVENTION

1. Field of the Invention

The present invention relates in general to an adjuster for adjusting the position of a seat belt holder installed in a motor vehicle, and more particularly to an adjuster for adjusting the height of a holder by which an uppermost end of a shoulder belt part of the seat belt is held.

2. Description of the Prior Art

In order to safely and comfortably fit a seat belt to a seat occupant, various types of seat belt position adjusters have been hitherto proposed and put into practical use. One of them is shown in FIGS. 13 and 14 of the accompanying drawings, which is applied to a three-point supported type seat belt and designed to adjust the height of an uppermost end of the shoulder belt part of the seat belt. More specifically, the adjuster adjusts the height of a through ring through which an upper portion of the shoulder belt part passes.

As is shown in FIG. 14, the conventional belt holder position adjuster comprises an elongate base member 501 which is formed with a plurality of latch holes 503 arranged in two rows. The base member 501 extends along a center pillar 302 of a motor vehicle body and is secured thereto by means of upper and lower bolts 505. Axially slidably disposed about the base member 501 is a box-like anchor member 507. The anchor member 507 is formed with a threaded hole (no numeral) with which a headed bolt 510 is meshingly engaged. The head is covered with a knob 509. The bolt 510 has, within the anchor member 507, a latch piece (not shown) pivotally connected thereto. The latch piece is formed with a pair of shank portions (not shown) which are latchingly engageable with a selected pair of the latch holes 503 of the base member 501. The anchor member 507 has further a nut 511 secured thereto. A pillar garnish 513 of plastic is attached to the center pillar 302 in a manner to conceal both the base member 501 and the anchor member 507. As is seen from FIG. 14, the pillar garnish 513 is formed with an elongate slot 513a. As is seen from FIG. 15, the pillar garnish 513 is further formed at its back side with two mutually facing guide grooves 515 and 515 which extend along side edges of the elongate slot 513a. A slide cover 517 of plastic is slidably held by the guide grooves 515 and 515 so that it slides along the elongate slot 513a while covering the same. The slide cover 517 is formed at its generally middle portion with larger and smaller openings (no numerals) through which the knob 509 and the nut 511 are passed and exposed to the outside of the pillar garnish 513. A through ring 519 is pivotally connected to the anchor member 507 by a bolt 521 secrewed to the nut 511. A cap 523 is fixed to the head of the bolt 521 to conceal the same. As is seen from FIG. 13, an upper portion of a shoulder belt part of a seat belt 301 passes through the through ring 519. A leading end of the shoulder belt part is led downard to an emergency lock type belt retractor (not shown) which is located at a lower portion of the center pillar 302.

Position adjustment of the through ring 519 is carried out in the following manner First, the knob 509 is manually turned in a given direction about the axis of the bolt 505. With this, the latching engagement between the latch pawls of the latch piece and the paired latch holes 503 of the base member 501 becomes cancelled. Thereafter, the anchor member 507 is moved on the base member 501 upward or downward toward a desired position at which the through ring 519 provides a belt wearer with a safe and comfortable belt fitting. When the anchor member 507 comes to the desired position, the knob 509 is turned in a reversed direction to advance the latch pawls and cause the latch pawls to be latchingly engaged with adacent new pair of latch holes 503 of the base member 501. With this, the through ring 519 is fixed at a newly selected anchoring position.

However, as will be understood from the above description, the conventional position adjuster has the following drawbacks. First, it is difficult or at least troublesome to slide the anchor member 507 to adjust the position where the latch pawls of latch piece are in coincidence with a desired pair of the latch holes 503 of the base member 501. In fact, such position search should be made by using both hands awkwardly. Second, manipulation or turning of the bolt 210 requires a considerable force. This is troublesome to a woman. Thus, it may occur that complete latching is not provided between the latch bolt 210 and the base member 201. Of course, this is very dangerous.

SUMMARY OF THE INVENTION

It is therefore an essential object of the present invention to provide a seat belt holder position adjuster which is free of the above-mentioned drawbacks.

According to the present invention, there is provided a seat belt holder position adjuster which can be easely manipulated with only one hand of an operator.

According to the present invention, there is provided a seat belt holder position adjuster which comprises a base unit formed with a plurality of latch holes, an anchor unit disposed on the base unit in a manner to slide therealong, a belt holding member connected to the anchor unit to move therewith, and a latch pawl unit mounted on the anchor unit, the latch pawl unit including shank portions which are latchingly engageable with some of the latch holes of the base member and biasing means for biasing the shank portions toward the base member.

DETAILED DESCRIPTION OF THE INVENTION

Figure 1:
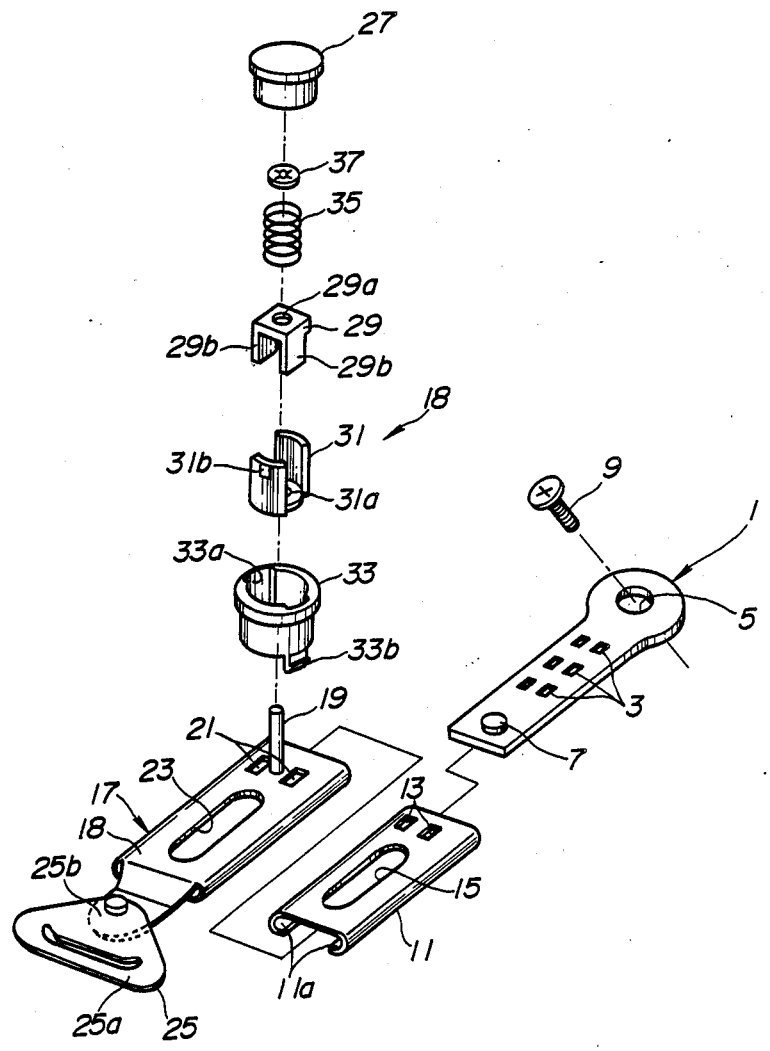
FIG. 1 is an exploded view of a position adjuster for a shoulder belt part of a seat belt, which is a first embodiment of the present invention.

In the following, the terms "right", "left", "upper", "lower" and the like are to be taken as referring to the drawings in which the corresponding parts are illustrated.

Figure 2:
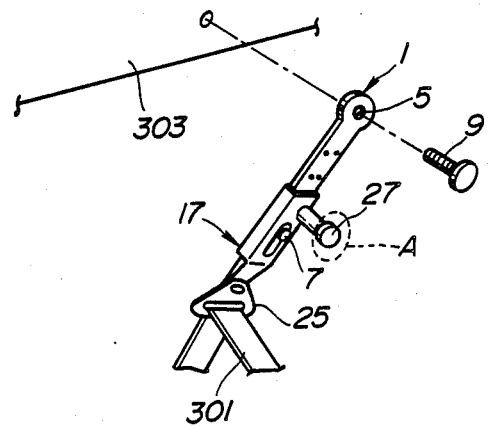
FIG. 2 is a perspective view of the position adjuster of the first embodiment, showing the manner in which the same is mounted to a vehicle body.
Figure 3:
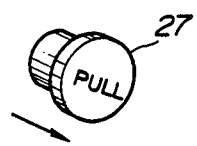
FIG. 3 is an enlarged view of the part enclosed by a circle "A" of FIG. 2.

Referring to FIGS. 1 to 3, particularly FIG. 1 of the accompanying drawings, there is shown a position adjuster for adjusting the height of a shoulder belt part of a seat belt, which is a first embodiment of the present invention. The position adjuster has, as major parts, an elongate base member 1, an anchor member 17 and a latch pawl unit 18.

The base member 1 is constructed of metal and formed with three pairs of latch holes 3 arranged in two rows. If desired, more than three pairs of latch holes may be formed in the elongate base member 1. An opening 5 is formed in a right enlarged end of the base member 1, which is used when the base member 1 is connected to a vehicle body. The left end of the base member 1 has a guide pin 7 secured thereto. Denoted by numeral 9 is a connecting bolt which is passed through the opening 5 of the base member 1 for connection of the same to the vehicle body.

The anchor member 17 containes therein a guide member 11 of plastic which has mutually facing guide grooves 11a and 11a along the sides thereof. The elongate base member 1 is slidably held by the guide grooves 11a, so that the guide member 11 and thus the anchor member 17 slide on and along the base member 1. The guide member 11 is formed at its right end with a pair of guide holes 13 and 13, and at its major portion with an axially extending guide slot 15. As will be clarified hereinafter, during the sliding movement of the guide member 11 relative to the base member 1, the guide pin 7 of the base member 1 travels in the slot 15. The diameter of a head of the guide pin 7 is so sized as to make a sliding contact with side edges of the slot 15 in oder to assure a steady sliding movement of the guide member 11 relative to the base member 1.

The anchor member 17 has a major portion 18 which is shaped like the guide member 11, but larger than the guide member 11, so that the major portion 18 tightly and neatly holds therein the guide member 11. The anchor member 17 has at its right end a shaft 19 fixed thereto. As is seen from the drawing, the anchor member 17 is formed, at portions corresponding to the portions where the afore-mentioned guide holes 13 and slot 15 of the base member 1 are formed, with a pair of guide holes 21 and 21 and a slot 23. The anchor member 17 has at the left end a through anchor plate 25 pivotally connected thereto. As is seen from FIG. 2, the through anchor plate 25 has a seat belt 301 (viz., a shoulder belt part of the belt) passed therethrough. For this, the through anchor plate 25 comprises an enlarged major portion 25a, having a slit (no numeral) through which the belt passes, and a connecting portion 25b having a bolt hole through which a bolt (no numeral) passes to be fixed to the major portion 18 of the anchor member 17. The enlarged major portion 25a is lined with a decorative plastic cover (no numeral).

The latch pawl unit 18 is disposed on the anchor member 17 in a manner to surround the fixed shaft 19, and comprises a latch piece 29. The latch piece 29 has two shank portions 29b and 29b directed downward and at a base portion thereof an opening 29a through which the shaft 19 passes. The latch piece 29 is put into a plastic latch holder 31 to constitute a couple. The couple is slidably put into a latch guide member receptacle member 33 of plastic which is detachably mounted on the major portion 18 of the anchor member 17. As will be clarified hereinafter, upon assembly, the shank portions 29b and 29b of the latch piece 29 are passed through the respective guide holes 21 and 13 of the united anchor member 17 and sliding member 11 to make a latching engagement with selected paired latch holes 3 of the base member 1.

As is seen from FIG. 1, the latch holder 31 is of a cylindrical member and has diametrically opposed cylindrical side portions cut thereby leaving a pair of semicylindrical side walls (no numerals) therebetween. The side walls are integrally connected at their lower ends to diametrically opposed portions of a circular base portion which has a center opening 31a through which the shaft 19 passes. Each side wall of the latch holder 31 is formed with a pawl 31b which locks a knob 27 when the latter is properly put on the holder 31. The latch piece 29 and the holder 31 are so coupled that the base portion of the latch piece 29 is in contact with the circular base portion of the holder 31 having the two shank portions 29b and 29b mated with the side cuts of the latch holder 31. The latch guide member 33 is of a cylindrical member and has, at diametrically opposed sides of its cylindrical inner bore, axially extending grooves 33a and 33a. Furthermore, the latch guide member 33 is formed, at diametrically opposed sides of its bottom portion, with respective pawls 33b and 33b (only one is shown) projected donward. Upon assembly, the grooves 33a and 33a receive therein the shank portions 29b and 29b of the latch piece 29 thereby to prevent rotation of the latch piece 29 about its axis, and the pawls 33b and 33b of the latch guide member 33 are latchingly engaged with the guide holes 21 and 21 of the anchor member 17 for detachably mounting the guide member 33 to the anchor member 17. Because each guide hole 21 of the anchor member 17 accomodates both the pawl 33b and the shank portion 29b of the latch piece 29, the hole 21 is somewhat larger in size than the guide hole 13 of the guide member 11.

Disposed on the latch piece 29 is a coil spring 35 which has an upper end seated on a push nut 37 fixed to an upper end of the fixed shaft 19. With the provision of the spring 35 slightly compressed, the latch piece 29 is slightly biased downward in FIG. 1, that is, in a direction to achieve the latching engagement between the shank portions 29b of the latch piece 29 and the latch holes 3 of the base member 1.

The knob 27 is constructed of plastic, which is detachably fixed to the plastic holder 31 by means of the pawls 31b of the latch holder 31, while spacedly receiving therein the spring 35 and the push nut 37. Thus, when the knob 27 is pulled upward, the latch holder 31 pushes the latch piece 29 upward against the force of the spring 35 thereby cancelling the latching engagement of the shank portions 29b of the latch piece 29 with the latch holes 3 of the base member 1. Thus, upon the knob 27 released from the operator's hand, the latch holder 31, the latch piece 29 and the knob 27 are returned to their original positions due to the force of the spring 35.

For mounting the position adjuster to a vehicle body, the following steps are taken.

As is seen from FIG. 2, the connecting bolt 9 is passed through the bolt hole 5 of the elongate base member 1 and screwed into a threaded hole (no numeral) formed in a roof side rail 303 of the vehicle body. With this, the position adjuster is pivotally or securedly connected to the roof side rail 303. The seat belt 301 (viz., a shoulder belt part of the same) is passed through the slit of the anchor plate 25 and led to an emergency lock type belt retractor (not shown) which is placed at a lower portion of the vehicle body.

Upon requirement of the position adjustment of the anchor plate 25, the following steps are taken.

First, as is seen from FIG. 3, the knob 27 is pulled toward this side against the biasing force of the spring 35. With this, as has been stated hereinabove, the latching engagment of the latch piece 29 (viz., the shank portions 29b of the same) with the base member 1 (viz., the latch holes 3 of the same) becomes cancelled. Thereafter, with the knob 27 kept pulled, the anchor member 17 is pushed or pulled relative to the base member 1 toward a desired position at which the anchor plate 25 provides a belt wearer with a safe and comfortable belt fitting. When the anchor member 17 comes to the desired position, the knob 27 is released from the operator's hand and thereafter the anchor member 17 is slightly moved. With this, the shank portions 29b of the latch piece 29 are brought into latching engagement with adjacent latch holes 3 of the base member 1, so that the anchor plate 25 is fixed at a newly selected belt anchoring position.

Advantages of the position adjuster of the first embodiment will be described in the following.

As is understood from the above description, the latching engagement between the anchor member 17 and the base member 1 is easily and assurely achieved only by slightly moving the anchor member 17 after completion of rough position search. This means that manipulation of the position adjust is achieved by only one hand of an operator, viz., a belt wearer.

Since the belt position adjuster is connected to the vehicle body by means of a single connecting bolt 9, the same is widely applicable to various types of motor vehicles including a hardtop type motor vehicle.

Figure 4:
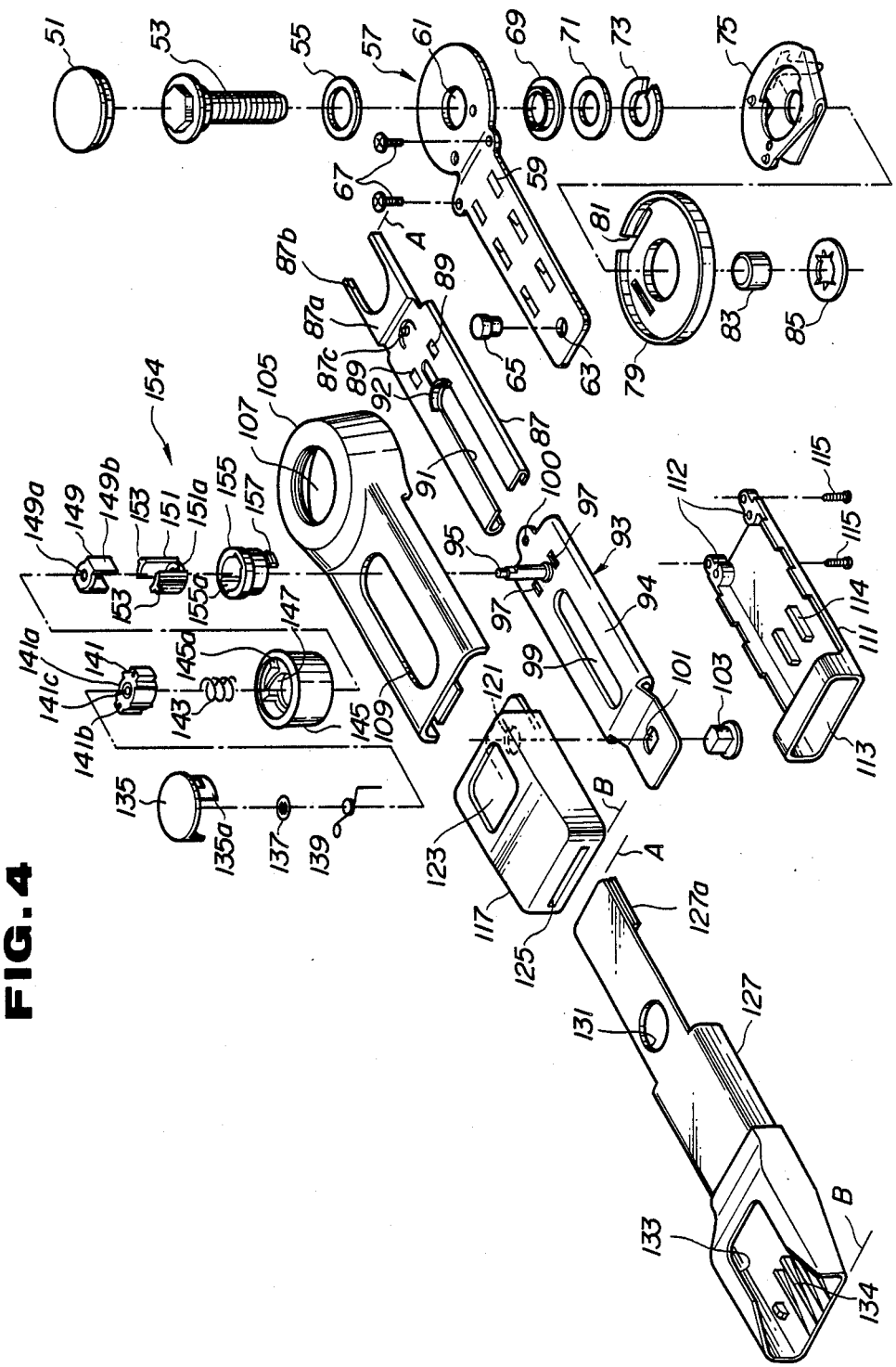
FIG. 4 is an exploded view of a position adjuster for a shoulder belt part of a seat belt which is a second embodiment of the present invention.
Figure 5:
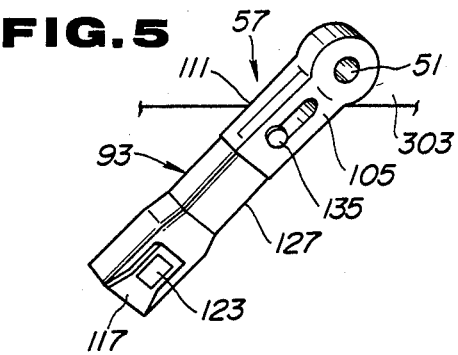
FIG. 5 is a perspective view of the position adjuster of the second embodiment, showing the manner in which the same is mounted to a vehicle body.

Referring to FIGS. 4 and 5, particularly FIG. 4, there is shown a position adjuster of a second embodiment of the present invention.

Similar to the above-mentioned first embodiment, an elongate base member 57 of the second embodiment is formed with latch holes 59 which are arranged in two rows. The base member 57 is formed at an enlarged right end portion thereof with a bolt hole 61, and at the left end portion thereof with a guide pin 65 secured thereto. For this securing of the guide pin 65, the left end portion is formed with an opening 63.

A guide member 87 of plastic is formed at its sides with mutually facing guide grooves (no numerals). Furthermore, the guide member 87 is formed with a pair of guide holes 89 and 89 as well as an axially extending guide slot 91. The guide slot 91 has a left end open to the outside. Similar to the above-mentioned first embodiment, the base member 57 is slidably held by the guide grooves of the guide member 87 having the guide pin 65 put in the guide slot 91. An arcuate wall 92 is integrally formed on the guide member 87 at an inboard end of the slot 91. Furthermore, the guide member 87 is formed at its right end, as viewed in FIG. 4, with a holder portion 87a for the purpose which will be clarified hereinafter. The holder portion 87a is formed with a semicircular cut 87b. The guide member 87 has near the holder portion 87a a projection 87c formed thereon.

Like the first embodiment, an anchor member 93 has a major portion similar in construction to the guide member 87, so that the anchor member 93 tightly and neatly holds therein the guide member 87. The anchor member 93 has at its right end a shaft 95 fixed thereto. The anchor member 93 has formed therein a pair of guide holes 97 and 97 and an elongate slot 99 which are mated with the guide holes 89 and 89 and the guide slot 91 of the guide member 87 when the guide member 87 is properly set in the anchor member 93. Upon this proper setting, the arcuate wall 92 of the guide member 87 is projected into the slot 99 of the anchor member 93 and contacts with an arcuate right end, as viewed in FIG. 4, of the slot 99. The arcuate wall 92 thus serves as not only a positioning member but also a damping member for the guide pin 65. In fact, upon assembly of the anchor member 93, the guide member 87 and the base member 57, the guide pin 65 of the base member 57 is projected into the slot 99 of the anchor member 93. Thus, when the base member 57 is drawn from the guide member 87 installed in the anchor member 93, the guide pin 65 slides in the slot 99 toward the right end of the slot 99 and finally collides with the arcuate wall 92 which is constructed of a plastic. Thus, the arcuate wall 92 serves as a damping member for the guide pin 65. The anchor member 93 has at its right end an opening 100 into which the projection 87c of the guide member 87 is snugly projected thereby achieving a relative positioning between the guide member 87 and the anchor member 93. The anchor member 93 has further at its left end an opening 101 into which a stud bolt 103 is passed for the purpose as will be described hereinafter.

Designated by numerals 105 and 111 are upper and lower decorative covers by which the base member 57 is covered. These covers are constructed of plastic. Between the base member 57 and the upper and lower covers 105 and 111, there are respectively defined upper and lower clearances into which the unit consisting of the anchor member 93 and the guide member 87 is insertable. The lower cover 111 is formed at its one end with a rectangular gate 113 through which a right portion of an after-mentioned buckle support cover 127 is slidably inserted. The lower cover 111 has further at its middle portion a pair of ribs 114 integrally formed thereon. The ribs 114 not only increase the rigidity of the lower cover 111 but also reduce the sliding friction created between the buckle support cover 127 and the lower cover 111.

The upper cover 105 is formed at its enlarged right end with a circular opening 107 to which an after-mentioned cap 51 is fixed. The upper cover 105 has further at its major portion an elongate slot 109 which has a length correponding to a moved distance of an aftermentioned knob 135. The lower cover 111 is secured to the base member 57 by means of bolt 67 and 67 each being passed through an opening (no numeral) of the base member 57 and screwed into a threaded hole 112 of the lower cover 111. The lower cover 111 is secured to the upper cover 105 by means of connecting screws 115 and 115 each being passed through an opening of the lower cover 111 and screwed into given portions of the upper cover 105.

Designated by numeral 117 is a known buckle by which a tongue (not shown) held by a seat belt is detachably caught. The buckle 117 thus has a slit 125 through which the tongue is inserted upon requirement of the tongue catching, and the buckle 117 further has a release button 123 thereon, which releases the tongue when pressed. The buckle 117 further has a flat projection in which an opening 121 is defined.

The buckle 117 is fixed to the anchor member 93 by means of the stud bolt 103 which passes through the opening 101 of the anchor member 93 and the opening 121 of the buckle 117. Thus, the buckle 117 and the anchor member 93 constitute an elongate unit.

The elongate unit is held in a buckle support cover 127 which is constructed of plastic. The buckle support cover 127 is formed at its generally middle portion with a circular opening 131 in which the knob 135 is accommodated, and at its left enlarged receptacle portion with a cut 133 through which the release button 123 of the buckle 117 is exposed to the outside when the buckle 117 is properly set in the buckle support cover 127. The receptacle portion of the cover 127 is integrally formed with a plurality of ribs 134 for increasing the rigidity of the same. When the buckle support cover 127 is properly mounted to the afore-mentioned elongate unit (117+93), the right end "A" of the cover 127 is placed at the right end "A" of the guide member 87 and the left end "B" of the cover 127 is placed at the left end "B" of the buckle 117.

At latch pawl unit 154 is used for latching the base member 57 at a desired position relative to the anchor member 93. The latch pawl unit 154 is substantially the same as that of the afore-mentioned first embodiment of FIG. 1 except small parts. That is, the latch pawl unit 154 comprises a generally U-shaped monolithic latch piece 149 which has two shank portions 149b and 149b and an opening 149a through which the shaft 95 of the anchor member 93 passes. The latch piece 149 is coupled with a plastic latch holder 151. The latch holder 151 has at its lower circular base portion a center opening 151a through which the shaft 95 passes. Diametrically opposed side walls of the latch holder 151 are formed at their upper ends with respectively projections 153 and 153. The latch piece 149 and the latch holder 151 thus coupled are slidably put into a latch guide member or receptacle member 155 which is a cylindrical plastic member. Axially extending grooves 155a are formed in the diametrically opposed sides of the cylindrical inner bore of the latch guide member 155. Respective pawls 157 (only one is shown) are formed on the bottom of the latch guide member 155, which are projected downward. The pawls 157 are latchingly engaged with the guide holes 97 and 97 of the anchor member 93 in order to detachably mount the guide member 155 on the anchor member 93 about the shaft 95. Upon assembly, the shank portions 149b of the latch piece 149 are slidably received in the grooves 155a of the latch guide member, so that the latch piece 149 is axially movable in the latch guide member 155. Similar to the case of the afore-mentioned first embodiment, the axial movement of the latch piece 149 induces selectively latched and unlatched conditions of the anchor member 93 relative to the base member 57.

The latch pawl unit 154 of this second embodiment further comprises a release button 145 which is of a cylindrical plastic member. The release button 145 has at its cylindrical inner wall two spiral grooves 147. The release button 145 is rotatably disposed about the latch guide member having the two grooves 147 operatively engaged with the projections 153 and 153 of the latch holder 151. A spring holder 141 is further employed, which is constructed of plastic. The spring holder 141 is formed with a pair of recesses 141a and a pair of ridges 141b which extend axially and are arranged at evenly spaced intervals about the outer surface of the holder 141. The spring holder 141 is formed with an axially extending through bore 141c. The holder 141 is put into the release button 145 having a spring 143 disposed therebetween and having the shaft 95 passed through the through bore 141c thereof. A push nut 137 is fixed to a top of the shaft 95. Under this condition, the convex side walls of the afore-mentioned latch holder 151 are mated at their inner surfaces with the bottom surfaces of the recesses 141a of the spring holder 141 respectively so that when the release button 145 is rotated about its axis to some extent, step portions 145a formed in the release button 145 are brought into abutment with the ridges 141b of the spring holder 141 thereby stopping the rotation of the release button 145. When the spring holder 141 is properly set in the release button 145, the coil spring 143 is somewhat compressed to bias the latch piece 149 and the latch holder 151 downward with a given force. A return spring 139 is connected to the release button 145 to bias the same in one direction about the axis thereof. Thus, when the release button 145 is manipulated to turn about its axis in the other direction and then released, the button 145 is instantly returned to its original position due to the force of the return spring 139.

The knob 135 is constructed of plastic and connected to the release button 145 in a snap action manner.

Upon mounting to the vehicle body, the base member 57 is connected to a roof side rail 303 of a motor vehicle by means of a bolt 53, as is understood from FIG. 4. That is, for this connection, the bolt 53 is passed through a plastic washer 55, the hole 61 of the base member 57, a plastic bush 69, a plane washer 71, a spring washer 73, a spring plate 75, a hole (no numeral) of an under cover 79, a collar 83 and a fiber washer 85 in this order, and then the bolt 53 is screwed into a nut (not shown) welded to the roof side rail 303.

The spring plate 75 is a spring plate which is bent into two parts. Upon assembly, the two parts put therebetween the under cover 79 having a bent portion (no numeral) passed through a slit 81 of the under cover 79.

The cap 51 is fixed to the circular opening 107 of the upper cover 105.

The position adjuster of the second embodiment is manipulated in the following manner.

When the knob 135 is manipulated to turn the release button 145 in a given direction, the latch holder 151 is raised upward in the guide member 155 because of sliding engagement between the pawls 153 of the latch holder 151 and the spiral grooves 147 of the release button 145. This upward movement of the latch holder 151 moves the latch piece 149 upward, so that finally, the shank portions 149b and 149b of the latch piece 149 are disengaged from the latch holes 59 of the base member 57. Then, with the knob 135 kept manipulated, the buckle support cover 127 (viz., the anchor member 93) is moved relative to the base member 57 to a desired position at which the buckle 117 provides a belt wearer with a safe and. comfortable belt fitting. Upon this, the knob 135 is released from the operator's hand. With this, the knob 135 and thus the release button 145 are turned in a reversed direction due to the force of the return spring 139 causing the latch holder 151 to be moved downward in the guide member 155. Thereafter, the buckle support cover 127 is slightly moved to just the position where the shank portions 149b of the latch piece 149 are properly mated with adjacent latch holes 59 of the base member 57. Upon this, due to the force of the coil spring 143, the shank portions 149b of the latch piece 149 are brought into latching engagement with the latch holes 59 of the base member 57. Thus, the buckle 117 installed in the buckle support cover 127 is fixed at a newly selected belt anchoring position.

Similar to the afore mentioned first embodiment, in the second embodiment, the latching engagement between the anchor member 93 and the base member 57 is assuredly and easily made by only sliding the anchor member 93 slightly after completion of the rough position search. Thus, manipulation of the position adjuster can be made by only one hand of the operator. Furthermore, since the position adjuster of the second embodiment is connected to the vehicle body by means of a single connecting bolt, the position adjuster is applicable to various types of motor vehicle including a hardtop type motor vehicle.

Figure 6:
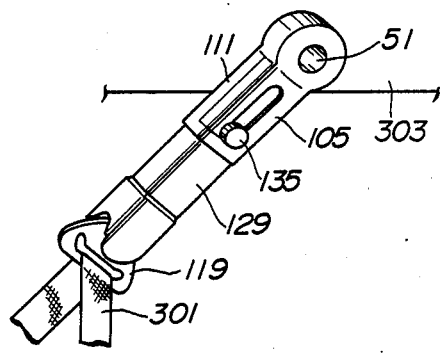
FIG. 6 is a view similar to FIG. 5, but showing a position adjuster of a third embodiment.
Figure 7:
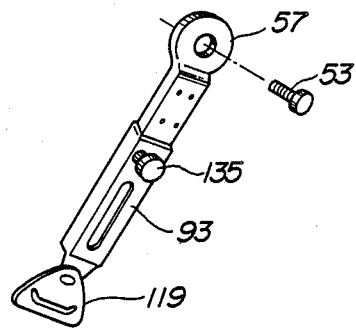
FIG. 7 is a perspective view of the position adjuster of the third embodiment with some covers removed.
Figure 8:
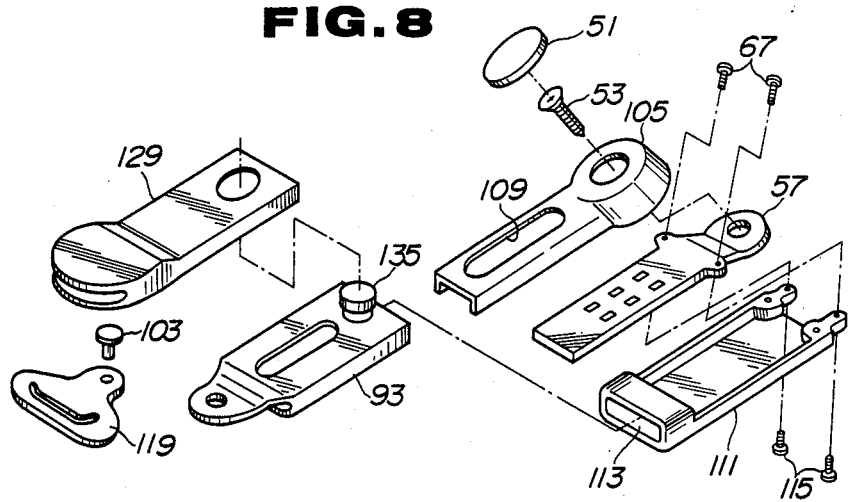
FIG. 8 is an exploded view of the position adjuster of the third embodiment.

Referring to FIGS. 6, 7 and 8, there is shown a position adjuster of a third embodiment of the present invention. The third embodiment is substantially the same as the afore-mentioned second embodiment except the following. As is seen from FIG. 7, a through anchor 119 is employed as a substitute for the buckle 117 of the second embodiment. This will be clarified from FIG. 8. That is, the through anchor 119 is connected to the anchor member 93 through the bolt 103, and a through anchor support cover 129 is employed to cover both the through anchor 119 and the anchor member 93.

Figure 9:
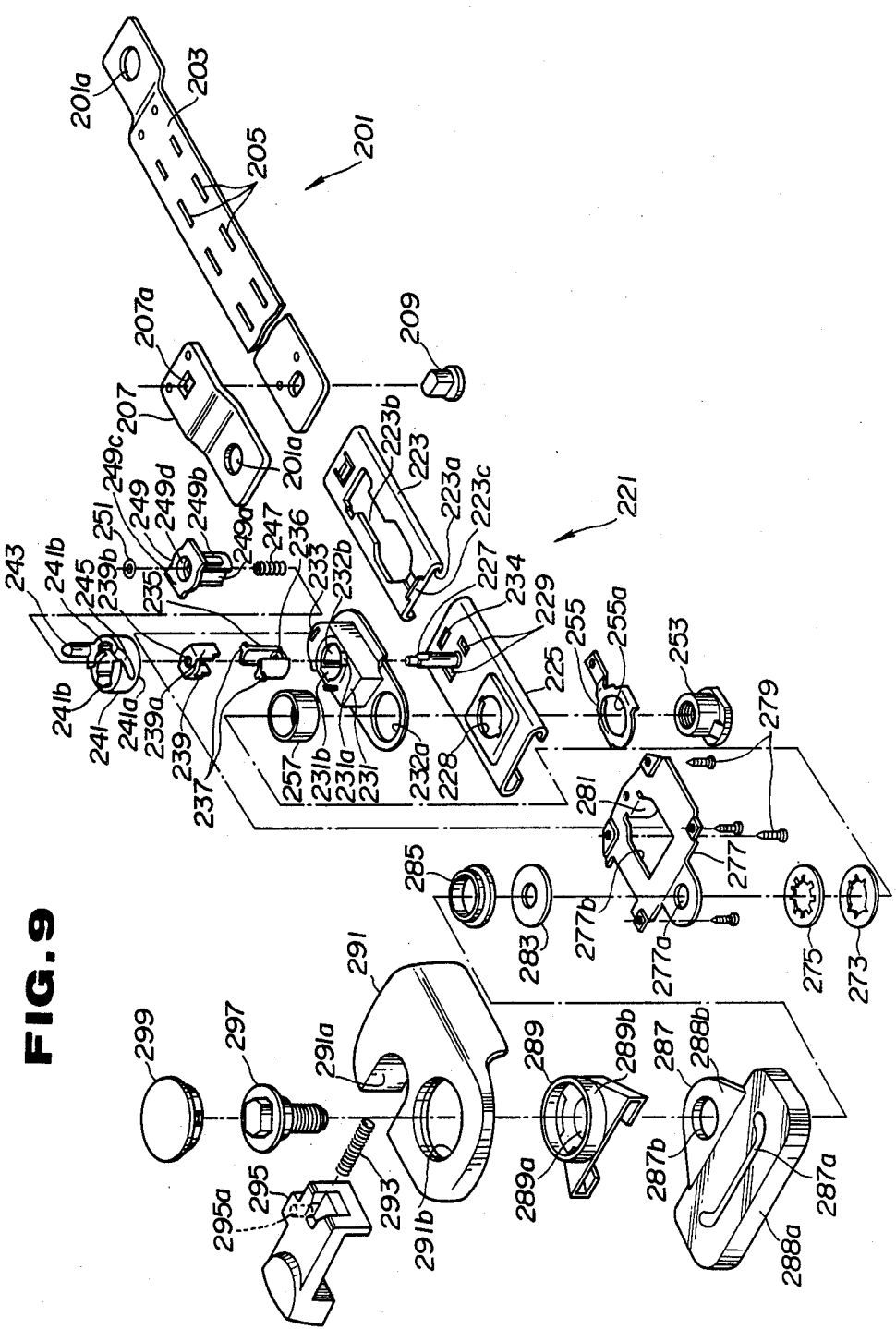
FIG. 9 is an exploded view of a position adjuster of a fourth embodiment of the present invention.

Referring to FIGS. 9 to 12, particularly FIG. 9, there is shown a position adjuster of a fourth embodiment of the present invention.

The position adjuster comprises generally a base unit 201, an anchor unit 221 and a latch pawl unit.

The base unit 201 comprises an elongate base member 203, an anchor plate 207 and a guide pin 209. The base member 203 is formed with four pairs of latch holes 205 which are arranged in two rows. The anchor plate 207 is secured to a left end of the base member 203 by the bolt 209. The base unit 201 is formed at its both ends with respective openings 201a which are used when the base unit 201 is connected to a center pillar panel 302 of a vehicle body (see FIG. 10).

The anchor unit 221 comprises a guide member 223 of plastic which is tightly and neatly held in an anchor member 225. As will become clarified as the description proceeds, the elongate base member 203 is slidably held by the guide member 223 installed in the anchor member 225, so that the anchor member 225 slides on and along the base member 203. For this purpose, the guide member 223 has at its both sides mutually facing guide grooves 223a by which the base member 203 is slidably supported. The guide member 223 is formed at its major portion with an enlarged opening 223b the contour of which is shaped like the numeral "8". The guide member 223 is formed at its left end with a raised portion 223c which serves as a damping member. That is, the raised portion 223c is brought into contact with a right end 207a of the anchor plate 207 when the guide member 223 slides on the base member 203 leftward as viewed in FIG. 9. Thus, the raised portion 223c serves as a damper. The anchor member 225 has a shape similar to that of the guide member 223, so that the anchor member 225 tightly and neatly holds therein the guide member 223. The anchor member 225 has at its right portion fixed thereto, and at its left portion a circular opening 228 formed therethrough. The latch holes 229 are formed in the anchor member 225 at positions beside the shaft 227.

The latch pawl unit comprises a latch guide member or receptacle member 231 which is mounted on the anchor member 225 in a manner as will be described hereinafter. The latch guide member 231 comprises a flat base part (no numeral) and a box-like part (no numeral) which is mounted on one side of the flat base part. The other side of the flat base part is formed with a circular opening 232a, and the box-like part is formed with a through bore 232b. The through bore 232b is formed at diametrically opposed side portions with grooves 231b each extending along the axis of the bore 232b. The box-like part is further formed at its right end a slit 233. The box-like part is formed at its top portion with four projections 231a which are arranged to surround the bore 232b. These projections function to hold an after-mentioned revolution cam 241. The latch guide member 231 is mounted to the anchor member 225 in such a manner that the bore 232b concentrically receives therein the shaft 227 and the circular opening 232a coincides with the opening 228. Although not shown in the drawing, the latch guide member 231 is formed at its back side with three latch pawls. Upon mounting of the latch guide member 231 to the anchor member 225, two of the latch pawls are brought into latching engagement with the guide holes 229 and the remaining latch pawl is brought into latching engagment with a latch hole 234 formed in the right end of the anchor member 225.

A plastic latch holder 235 is a member which comprises a circular base portion 236 and two semicylindrical side walls (no numerals) which are raised upward from diametrically opposed sides of the base portion 236. The base portion 236 has a center opening formed therethrough. Each side wall is formed at its top with a projection 237 which projects radially outwardly. The latch holder 235 is received in the bore 232b of the latch guide member 231 having the shaft 227 passed through the center opening thereof.

A latch piece 239 is a plastic member which comprises a base portion (no numeral) and two shank portions 239a and 239a which extend downwardly from opposed sides of the base portion. The base portion is formed with a center opening 239b. The latch piece 239 is put into the latch holder 235 having the shank portions 239a and 239a mated with the cut portions of the holder 235. Upon this, the shank portions 239a are received in the grooves 231b of the latch guide member 231, and the lower base portion 236 of the latch holder 235 is in contact with the upper base portion of the latch piece 239. The shank portions 239a are passed through the guide holes 229 of the anchor member 225 to be mated with adjacent pair of the latch holes 205 of the base member 203.

The revolution cam 241 is a plastic member which functions to change the direction of force applied thereto. As is seen from the drawing, the cam 241 is of a cylindrical member which has at one side a stud portion 243. The cam 241 is formed at its cylindrical wall with a pair of spiral grooves 245. An inner diameter of the revolution cam 241 is somewhat larger than the outer diameter of the latch holder 235. The revolution cam 241 and the latch holder 235 are so arranged that the projections 237 of the latch holder 235 are slidably engaged with the spiral grooves 245 of the cam 241. Each groove 245 is so shaped that when the cam 241 is turned in a given direction (viz., in a clockwise direction in FIG. 9), the latch holder 235 (and thus the latch piece 239) is moved upward, that is, in a direction to move the shank portions 239a away from the base member 203. The revolution cam 241 is formed at the bottom thereof with a circular boss 241a (not shown) which is rotatably received in the bore 232b of the latch guide member 231. The bottom portion of the cam 241 is slidably supported by the four projections 231a formed on the box-like part of the latch guide member 231.

A coil spring 247 is disposed on the upper base portion of the latch piece 239 having the shaft 227 passed therethrough.

A spring holder 249 is of a cylindrical plastic member which is formed about its outer suface with a pair of recesses 249a and a pair of ridges 249b which are arranged at evently spaced intervals The spring holder 249 has further at its top portion a generally rectangular flange 249c. The spring holder 249 is formed with a center bore 249d through which the shaft 227 is passed. A push nut 251 is fixed to the top of the shaft 227. Under this condition, the semicylindrical side walls of the latch holder 235 are in contact with the bottom portions of the recesses 249a of the spring holder 249. Thus, when the revolution cam 241 is turned about its axis to some extent, steps 241b formed in the bore of the cam 241 are brought into contact with the ridges 249b of the spring holder 249. Thus, the steps 241b serves as stoppers. When the spring holder 249 is set in its proper position, the coil spring 247 is somewhat compressed thereby biasing both the latch piece 239 and the latch holder 235 downward with a given force.

A nut 253 with a flange is disposed in the circular opening 228 of the anchor member 225 with an apertured leaf spring 255 disposed therebetween. The leaf spring 255 is formed with a tongue portion (no numeral). The aperture of the spring 255 is denoted by numeral 255a. In order to fix the nut 253 to the anchor member 225, a bush 257 is fitted to an exposed upper portion of the nut 253 and cauked. Upon assembly, the leading end of the leaf spring 255 abuts on an upper surface of the base member 203 thereby to suppress undesired play of the anchor member 225 relative to the base member 205.

Designated by numeral 277 is a separate plate which has at its left end a circular opening 277a and at its major portion a rectangular opening 277b . A tongue portion 281 is projected downward from a right edge of the rectangular opening 277b , as shown. The separate plate 277 is secured to an inner side of an anchor cover 291 of plastic by means of four tapping screws 279. The anchor cover 291 is formed with a smoothed recess 291a for receiving the thumb of a right hand of an operator when he or she grips the anchor cover 291. The major portion of the anchor cover 291 is formed with a circular opening 291b. Upon assembly, the circular opening 277a of the separate plate 277 and the opening 291b are in a concentric relationship.

A through anchor 287 is a rigid member by which a portion of a seat belt 301 (see FIG. 10) is held. The through anchor 287 comprises a major portion 288a in which a slit 287a is formed, and a triangular connecting portion 288b in which a circular opening 287b is formed. The major portion 288a is covered with a plastic layer. The triangular connecting portion 288b is received in a receptacle portion of an anchor side cover 289. The anchor side cover 289 is made of plastic and formed with a collar portion 289b at its major portion. The major portion is formed with a circular opening 289a which is concentric with the collar portion 289b. Upon assembly, the opening 287b of the through anchor 287 and the opening 289a of the anchor side cover 289 become concentric with each other.

Movably disposed in the recess 291a of the anchor cover 291 is a release button 295 of plastic. A coil spring 293 is compressed between the release button 295 and the bottom of the recess 291a for biasing the button away from the anchor cover 291. At a right side of the release button 295, there is formed a recess 295a into which the afore-mentioned stud portion 243 of the revolution cam 241 is received. Thus, when the release button 295 is pushed against the spring 293, the revolution cam 241 is turned in a clockwise direction in FIG. 9, and then when the button 295 is released and thus returned to its original position due to the force of the spring 293, the revolution cam 241 is turned in a reversed direction, viz., in a counterclockwise direction.

Figure 10:
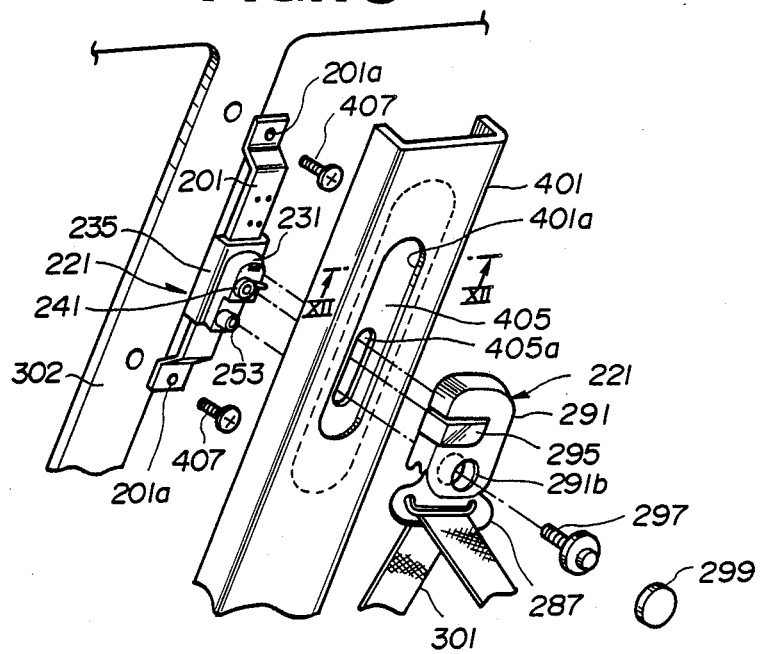
FIG. 10 is a partially exploded perspective view of the position ajuster of the fourth embodiment, showing the manner in which the same is mounted to a vehicle body.
Figure 12:
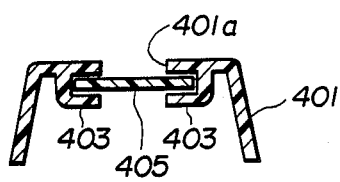
FIG. 12 is a sectional view taken along the line XII—XII of FIG. 10.
Figure 13:
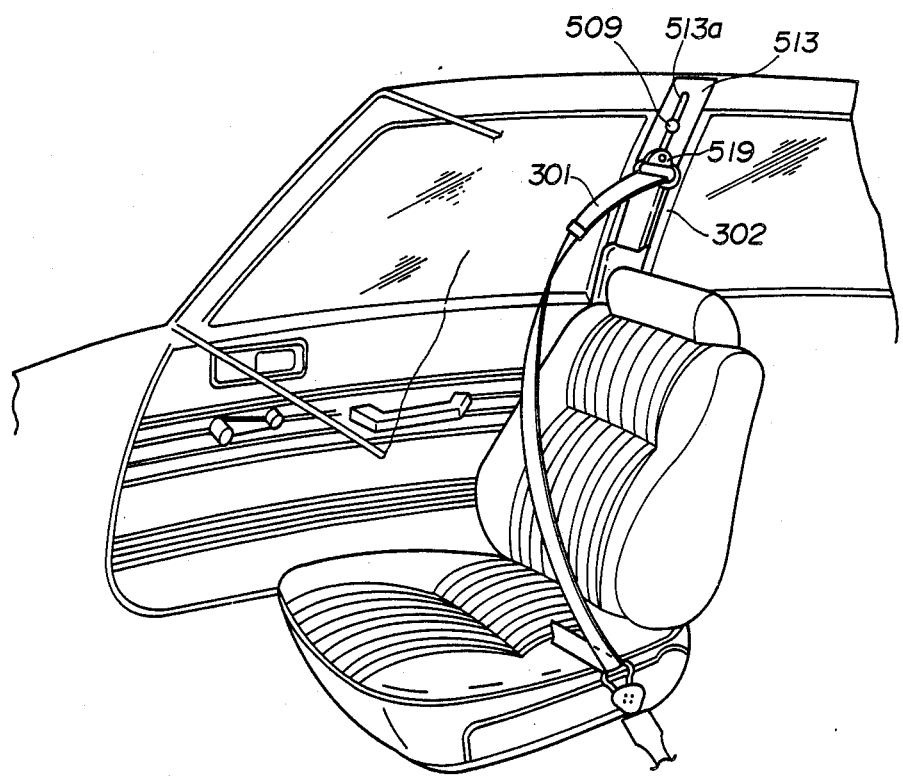
FIG. 13 is a view of a passenger room of a motor vehicle in which a conventional belt holder position adjuster is installed.
Figure 14:
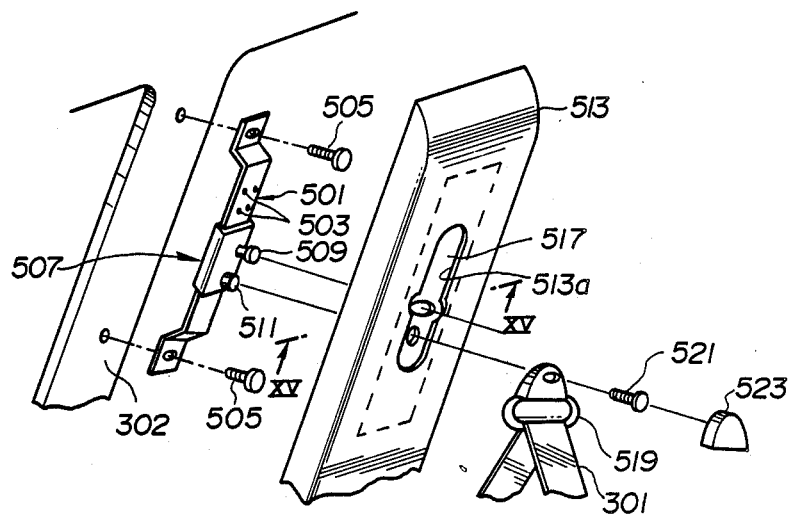
FIG. 14 is an exploded view of the conventional belt holder position adjuster, showing the manner in which the same is mounted to a center pillar of the motor vehicle.
Figure 15:
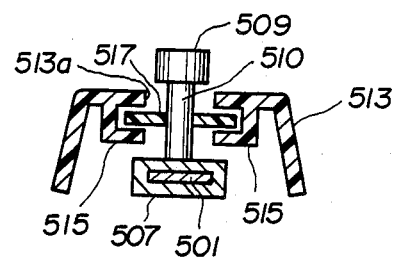
FIG. 15 is a sectional view taken along the line XV—XV of FIG. 14.

Referring to FIG. 10, a pillar garnish 401 is shown, which covers both the base unit 201 and the anchor unit 221 The pillar garnish 401 is formed with an axially extending slot 401a As is seen from FIG. 12, the pillar garnish 401 is formed at its inside portion with mutually facing grooves 403 and 403 which extend along the side edges of the slot 401a A slide cover 401a of plastic is slidably held by the grooves 403 and 403, so that the slide cover 401a slides relative to the pillar garnish 401 while covering the slot 401a The slide cover 405 is formed with a smaller slot 405a The position adjuster of the fourth embodiment is mounted to a vehicle body (viz., center pillar panel) in a manner as will be described hereinbelow.

First, the base unit 201 carrying thereon essential part of the anchor member 225 is fixed to the center pillar 302 by means of two connecting bolts 407 and 407 which are passed through the bolt holes 201a and 201a and screwed into respective nuts (not shown) welded to the center pillar 302 Then, the pillar garnish 401 is connected to the center pillar 302 in such a manner that the nut 253 and the revolution cam 241 are put into the slot 405a of the slide cover 405 and exposed to the open side. Then, the anchor cover 291 carrying thereon the release button 295 is connected to the anchor member 221 from the outside of the pillar garnish 401 That is, as is best understood from FIG. 9, a bolt 297 is passed through the circular opening 291b of the anchor cover 291, the opening 289a of the anchor side cover 289, the opening 287b of the through anchor 287, a plastic bush 285, a plane washer 283, the opening 277a of the separate plate 277, a toothed washer 275 and a fiber wahser 273 in this order. Then, the bolt 297 is passed through the slot 405a of the slide cover 405 (see FIG. 10) and screwed into the nut 253 secured to the anchor member 225. During this, the stud portion 243 of the revolution cam 241 is put into the recess 295a of the release button 295, and the tongue portion 281 of the separate plate 277 is inserted into the slit 233 of the latch guide member 231 A circular cap 299 is fitted to the circular opening 291b of the anchor cover 291 in a snap action manner FIG. 11 shows the position adjuster in an assembled condition.

The position adjustment of the seat belt 301 (viz., the shoulder belt part of the belt) is carried out in the following manner.

Figure 11:
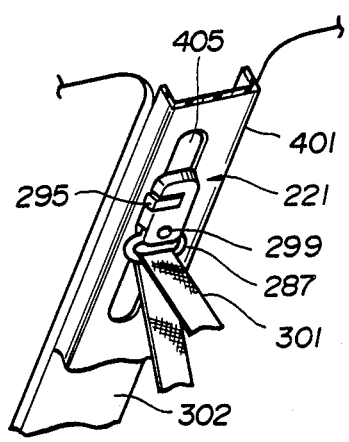
FIG. 11 is a perspective view of the position adjuster of the fourth embodiment in an assembled condition.

When, as will be understood from FIG. 11, the position adjuster is gripped by a belt wearer (not shown) using the right hand, the thumb contacts the release button 295. This means that the position adjuster of the fourth embodiment can be operated by only one (viz., right) hand. When the release button 295 is depressed by the thumb against the biasing force of the spring 293, the revolution cam 241 is turned in a clockwise direction in FIG. 9. The rotation of the cam 241 raises the latch holder 235 and thus the latch piece 239 against the force of the spring 247 from the bore 232b of the latch guide member 231 due to the sliding engagement between the projections 237 of the latch holder 235 and the spiral grooves 245 of the revolution cam 241. Thus, the shank portions 239a of the latch piece 239 are drawn out from the paired latch holes 205 of the base member 203. Thereafter, with the release button 295 kept depressed, the position adjuster (more specifically, the anchor member unit 225) is slid along the base member 203 toward a desired new position. When the position adjuster comes to the desired position, the release button 295 is released from the thumb With this, the button 295 and thus the revolution cam 241 are returned to their original positions due to the force of the spring 293, so that the latch holder 235 is moved downward. At the same time, due to the biasing force of the spring 247, the latch piece 239 is moved downward causing the shank portions 239a to be pressed against the surface of the base member 203. When, thereafter, the position adjuster is slightly moved to just a position where the shank portions 239a are in coincidence with a new pair of latch holes 205, the shank portions 239a are brought into latching engagement with the new pair of latch holes 205. With these manipulations, the through anchor 287 is fixed at a newly selected belt anchoring position.

The position adjuster of the fourth embodiment has the following advantages.

Due to its unique construction as described hereinabove, manipulation of the position adjuster can be made by only one hand with ease.

Because the release button 295 is neatly held in the recess 291a of the anchor cover 291, the position adjuster has a good external appearance. Furthermore, the adjuster provides a user with a good feeling when gripped.

What is claimed is:

1. A seat belt holder position adjuster comprising:
   a base unit including an elongate base member having two adjacent rows of latch holes formed therethrough;
   an anchor unit disposed on said base unit in a manner to slide therealong;
   a belt holding member connected to said anchor unit to move therewith; and
   a latch pawl unit mounted on said anchor unit, said latch pawl unit including a generally U-shaped monolithic latch piece having two shank portions which are sized and arranged to be latchingly engageable with an adjacent pair of latch holes, said pair comprising a latch hole from each of said two adjacent rows of the base unit, and a biasing means for biasing said latch piece in a direction to achieve latching between said shank portions and said paired latch holes,
   wherein said anchor unit includes guide holes through which said shank portions of said latch pawl unit are passed to be exposed to said elongate base member, an anchor member, and a guide member tightly held by said anchor member, said guide member having at its sides mutually facing guide grooves by which said base member is slidably guided.

2. A seat belt holder position adjuster as claimed in claim 1, in which said anchor member and said guide member are formed with the guide holes respectively which are in coincidence with each other.

3. A seat belt holder position adjuster as claimed in claim 2, in which said belt holding member is a through anchor which is pivotally connected to said anchor member and has a slit through which a seat belt passes.

4. A seat belt holder position adjuster as claimed in claim 2, in which said belt holding member is a buckle which is secured to said anchor member.

5. A seat belt holder position adjuster as claimed in claim 2, in which said latch pawl unit comprises:
   a receptacle member mounted on said base member;
   a latch holder movably received in said receptacle member;
   a latch piece formed with said shank portions, said latch piece being movably received in said latch holder with said shank portions directed toward said base member, said latch piece and said latch holder being so coupled that when said latch holder is moved away from said anchor member, the same moves said latch piece in such a direction that the shank portions are disengaged from the latch holes of the base member; and
   said biasing means includes a spring associated with said latch piece to bias the same in such a direction that the shank portions are brought into latching engagement with the latch holes of the base member.

6. A seat belt holder position adjuster as claimed in claim 5, in which said latch pawl unit further comprises a shaft which is fixed to the anchor member to guide the movement of said latch piece and said latch holder.

7. A seat belt holder position adjuster as claimed in claim 6, in which said receptacle member, said latch holder and said latch piece have respective openings through which said shaft passes.

8. A seat belt holder position adjuster as claimed in claim 7, in which said spring is a coil spring which is disposed about said shaft and has an upper end seated on a push nut which is fixed to a top of said shaft.

9. A seat belt holder position adjuster as claimed in claim 8, further comprising a manually operated unit which induces an axial movement of said latch holder when manually operated.

10. A seat belt holder position adjuster as claimed in claim 9, in which said manually operated unit comprises a returning means which returns said latch holder to its original operative position when the manual operation applied to said manually operated unit is ceased.

11. A seat belt holder position adjuster as claimed in claim 10, in which said returning means comprises:
projections formed on said latch holder;
a cylindrical release button disposed about said receptacle member, said release button having at its cylindrical inside wall spiral grooves with which said projections of said latch holder are slidably engaged; and
biasing means for biasing said cylindrical release button to turn about its axis in a given direction.

12. A seat belt holder position adjuster as claimed in claim 11, further comprising means which suppresses rotation of said latch holder about its axis even when said cylindrical release button is rotated about its axis.

13. A seat belt holder position adjuster as claimed in claim 12, in which said biasing means is a spring which is associated with said cylindrical release button to bias the same to return to the original operative position.

14. A seat belt holder position adjuster as claimed in claim 10, in which said returning means comprises:
projections formed on said latch holder;
a revolution cam rotatably disposed on said receptacle member, said revolution cam having at its cylindrical wall portion spiral grooves with which said projections of said latch holder are slidably engaged; and
biasing means for biasing said revolution cam to turn about its axis in a given direction.

15. A seat belt holder position adjuster as claimed in claim 14, further comprising means for suppressing of said latch holder even when said revolution cam is rotated about its axis.

16. A seat belt holder position adjuster as claimed in claim 15, in which said biasing means is a spring which is associated with said revolution cam to bias the same to return to the original operative position.

17. A seat belt holder position adjuster as claimed in claim 2, further comprising guide means which guides the sliding movement of said anchor unit relative to said base unit, said guide means comprising a pin fixed to said base member of said base unit; and
an elongate slot formed in said anchor unit, said pin being slidably engaged with said slot.

18. A seat belt holder position adjuster as claimed in claim 17, in which said guide means comprises:
a pin fixed to said base member of said base unit; and
an elongate slot formed in said anchor unit, said pin being slidably engaged with said slot.

19. A seat belt holder position adjuster comprising:
an elongate base member formed with a plurality of latch holes which are arranged in two rows;
a guide member having at its both sides mutually facing guide gooves by which said base member is slidably held;
an anchor member tightly holding therein said guide member to constitute an anchor unit, said anchor unit being formed with two guide holes formed therethrough;
a shaft fixed to said anchor unit;
a cylindrical latch guide member disposed on said anchor unit in a manner to surround said shaft;
a latch holder axially movably received in said latch guide member, said latch holder having an opening through which said shaft passes;
a latch piece movably coupled with said latch holder and having an opening through which said shaft passes, said latch piece having two shank portions passed through said guide holes and directed toward said base member, said latch piece and said latch holder being so coupled that when said latch holder is moved away from said latch guide member, said latch piece is moved away from said anchor unit thereby to move the shank portions away from said base member;
a coil spring disposed about said shaft and compressed between said latch piece and a spring seat which is fixed to a top of said shaft; and
a knob fixed to said latch holder.

20. A seat belt holder position adjuster as claimed in claim 19, in which said latch guide member has two latch pawls which are latchingly engaged with said guide holes of said anchor unit.

21. A seat belt holder position adjuster as claimed in claim 20, in which said latch guide member is formed at diametrically opposed side portions of its cylindrical bore with axially extending grooves in which said shank portions of said latch piece are slidably received.

22. A seat belt holder position adjuster as claimed in claim 21, in which said latch holder comprises:
a circular base portion; and
two semicylindrical side walls which extend in the same direction from diametrically opposed sides of said circular base portion leaving therebetween two clearances.

23. A seat belt holder position adjuster as claimed in claim 22, in which said shank portions of said latch piece are received in said two clearances respectively.

24. A seat belt holder position adjuster as claimed in claim 22, further comprising:
a guide pin fixed to said base member; and
means defining in said anchor unit an elongate slot which extends along the axis of said anchor unit, said pin being slidably engaged with said slot.

25. A seat belt holder position adjuster as claimed in claim 24, further comprising a through anchor which is pivotally connected to said anchor unit, said through anchor having a slit through which a portion of a seat belt passes.

26. A seat belt holder position adjuster comprising:
an elongate base member formed with a plurality of latch holes which are arranged in two rows;
a guide member having at its both sides mutually facing guide grooves by which said base member is slidably held;
an anchor member tightly holding therein said guide member to constitute an anchor unit, said anchor unit having two guide holes formed therethrough;
a shaft fixed to said anchor unit;
a cylindrical latch guide member disposed on said anchor unit in a manner to surround said shaft;
a latch holder axially movably received in said latch guide member, said latch holder having an opening through which said shaft passes, said latch holder having projections formed thereon;
a latch piece movably coupled with said latch holder and having an opening through which said shaft passes, said latch piece having two shaft portions passed through said guide holes of the anchor unit and directed toward said base member, said latch piece and said latch holder being so coupled that when said latch holder is moved away from said latch guide member, said latch piece is moved away from said anchor unit thereby to move the shank portions away from said base member;

a coil spring disposed about said shaft and compressed between said latch piece and a spring seal fixed to a top of said shaft;

a cylindrical release button rotatably disposed about said latch guide member, said release button having at its cylindrical inner wall two spiral grooves with which said projections of the latch holder are slidably engaged; and a return spring biasing said release button to turn about its axis in a given direction.

27. A seat belt holder position adjuster as claimed in claim 26, in which a spring holder is disposed between said coil spring and said spring seat, said spring holder having stopper portions by which said release button is prevented from making excessive rotation.

28. A seat belt holder position adjuster as claimed in claim 27, in which said release button is equipped with a knob.

29. A seat belt holder position adjuster as claimed in claim 18, in which said latch guide member has two latch pawls which are latchingly engaged with said guide holes of said anchor unit.

30. A seat belt holder position adjuster as claimed in claim 29, in which said latch guide member is formed at diametrically opposed side portions of its cylindrical bore with axially extending grooves in which said shank portions of the latch piece are slidably received.

31. A seat belt holder position adjuster as claimed in claim 30, in which said latch holder comprises:
 a circular base portion; and
 two semicylindrical side walls which extend in the same direction from diametrically opposed sides of said circular base portion leaving therebetween two clearances.

32. A seat belt holder position adjuster as claimed in claim 31, in which said shank portions of the latch piece are received in said two clearances respectively.

33. A seat belt holder position adjuster as claimed in claim 32, in which said elongate base member is held in a plastic cover which is dividable into two parts.

34. A seat belt holder position adjuster as claimed in claim 33, in which said anchor unit is tightly connected to a buckle to constitute an elongate unit.

35. A seat belt holder position adjuster as claimed in claim 34, in which said elongate unit is covered with a plastic cover.

36. A seat belt holder position adjuster as claimed in claim 35, in which said plastic cover is formed with a receptacle portion in which said buckle is received.

37. A seat belt holder position adjuster as claimed in claim 36, further comprising:
 a guide pin fixed to said base member;
 means defining in said anchor unit an elongate slot which extends along the axis of the anchor unit, said guide pin being slidably engaged with said slot.

38. A seat belt holder position adjuster comprising:
 an elongate base member formed with a plurality of latch holes which are arranged in two rows;
 a guide member having at its both sides mutually facing guide grooves by which said base member is slidably held;
 an anchor member tightly holding therein said guide member to constitute an anchor unit, said anchor unit having two guide holes formed therethrough;
 a shaft fixed to said anchor unit;
 a receptacle member disposed on said anchor unit in a manner to surround said shaft,
 a latch holder axially movable received in said receptacle member, said latch holder having an opening through which said shaft passes, said latch holder having projections formed thereon;
 a latch piece movably coupled with said latch holder and having an opening through which said shaft passes, said latch piece having two shaft portions passed through said guide holes of the anchor unit and directed toward said base member, said latch piece and said latch holder being so coupled that when said latch holder is moved away from said receptacle member, said latch piece is moved away from said anchor unit thereby to move the shank portions away from said base member;
 a coil spring disposed about said shaft and compressed between said latch piece and a spring seat fixed to a top of the shaft;
 a revolution cam rotatably disposed on said receptacle member in a manner to surround said shaft, said cam having at its cylindrical outer wall two spiral grooves with which said projections of said latch holder are slidably engaged, said revolution cam having a stud formed thereon;
 a cover member covering said anchor unit;
 a release button movably mounted on said cover member, said release button having a recess into which said stud of said revolution cam is received; and
 a spring associated with said release button to bias the same in a given direction.

39. A seat belt holder position adjuster as claimed in claim 38, in which said receptacle member is formed with supporting projections on which said revolution cam is slidably supported.

40. A seat belt holder position adjuster as claimed in claim 39, in which said cover member is formed with a smoothed recess in which said release button is operatively held.

41. A seat belt holder position adjuster as claimed in claim 40, in which said spring is compressed between said release button and the bottom of said smoothed recess of the cover member.

42. A seat belt holder position adjuster as claimed in claim 41, in which said receptacle member is formed with a plurality of pawls which are latchingly engaged with holes formed in said anchor unit.

43. A seat belt holder position adjuster as claimed in claim 42, in which two of said holes are the guide holes through which the shank portions pass.

44. A seat belt holder position adjuster as claimed in claim 43, in which said receptacle member is formed, at diametrically opposed side portions of its cylindrical bore, with axially extending grooves in which said shank portions of the latch piece are slidably received.

45. A seat belt holder position adjuster as claimed in claim 44, in which said latch holder comprises:
 a circular base portion;
 two semicylindrical side walls which extend in the same direction from diametrically opposed sides of said circular base portion leaving therebetween two clearances.

46. A seat belt holder position adjuster as claimed in claim 45, in which said shank portions of the latch piece are received in said two clearances respectively.

47. A seat belt holder position adjuster as claimed in claim 46, in which said base member comprises:
 a first base member; and a second base member connected to said first base member to constitute an elongate base member.

48. A seat belt holder position adjuster as claimed in claim 47, in which said anchor unit is connected to a through anchor through which a portion of the seat belt passes.

49. A seat belt holder position adjuster as claimed in claim 48, in which said through anchor is connected to said anchor unit through a bolt which passes through an opening formed in said cover member.

50. A seat belt holder position adjuster comprising:
a base unit formed with a plurality of latch holes;
an anchor unit disposed on said base unit in a manner to slide therealong;
a belt holding member connected to said anchor unit to move therewith;
a latch pawl unit mounted on said anchor unit, said latch pawl unit including shank portions which are latchingly engageable with some of said latch holes of the base member and biasing means for biasing said shank portions toward said base member;
wherein said base unit comprises an elongate base member, and in which said latch holes are formed in said elongate base member and arranged in said two rows;
said anchor unit has guide holes through which said shank portions of said latch pawl unit are passed to be exposed to said elongate base member, said anchor unit comprising:
a anchor member;
a guide member tightly held by said anchor member, said guide member having at its sides mutually facing guide grooves by which said base member is slidably guided;
said anchor member and said guide member are formed with the guide holes respectively which are in coincidence with each other;
wherein said latch pawl unit comprises:
a receptacle member mounted on said base member;
a latch holder movably received in said receptacle member;
a latch piece formed with said shank portions, said latch piece being movably received in said latch holder with said shank portions directed toward said base member, said latch piece and said latch holder being so coupled that when said latch holder is moved away from said anchor member, the same moves said latch piece in such a direction that said shank portions are disengaged from said latch holes of the base member; and
wherein said biasing means includes a spring associated with said latch piece to bias the same in such a direction that said shank portions are brought into latching engagement with said latch holes of said base member.

51. A seat belt holder position adjuster as claimed in claim 50, in which said latch pawl unit further comprises a shaft which is fixed to the anchor member to guide the movement of said latch piece and said latch holder.

52. A seat belt holder position adjuster as claimed in claim 51, in which said receptacle member, said latch holder and said latch piece have respective openings through which said shaft passes.

53. A seat belt holder position adjuster as claimed in claim 52, in which said spring is a coil spring which is disposed about said shaft and has an upper end seated on a push not which is fixed to a top of said shaft.

54. A seat belt holder position adjuster as claimed in claim 53, further comprising a manually operated unit which induces an axial movement of said latch holder when manually operated.

55. A seat belt holder position adjuster as claimed in claim 54 in which said manually operated unit comprises a returning means which returns said latch holder to its original operative position when the manual operation applied to said manually operated unit is ceased.

56. A seat belt holder position adjuster as claimed in claim 55, in which said returning means comprises:
projections formed on said latch holder;
a cylindrical release button disposed about said receptacle member, said release button having at its cylindrical inside wall spiral grooves with which said projections of said latch holder are slidably engaged; and
biasing means for biasing said cylindrical release button to turn about its axis in a given direction.

57. A seat belt holder position adjuster as claimed in claim 56, further comprising means which suppresses rotation of said latch holder about its axis even when said cylindrical release button is rotated about its axis.

58. A seat belt holder position adjuster as claimed in claim 57, in which said biasing means is a spring which is associated with said cylindrical release button to bias the same to return to the original operative position.

59. A seat belt holder position adjuster as claimed in claim 55, in which said returning means comprises:
projections formed on said latch holder;
a revolution cam rotatably disposed on said receptacle member, said revolution cam having at its cylindrical wall portion spiral grooves with which said projections of said latch holder are slidably engaged; and
biasing means for biasing said revolution cam to turn about its axis in a given direction.

60. A seat belt holder position adjuster as claimed in claim 59, further comprising means for suppressing rotation of said latch holder even when said revolution cam is rotated about its axis.

61. A seat belt holder position adjuster as claimed in claim 60, in which said biasing means is a spring which is associated with said revolution cam to bias the same to return to the original operative position.

* * * * *